Patented July 12, 1938

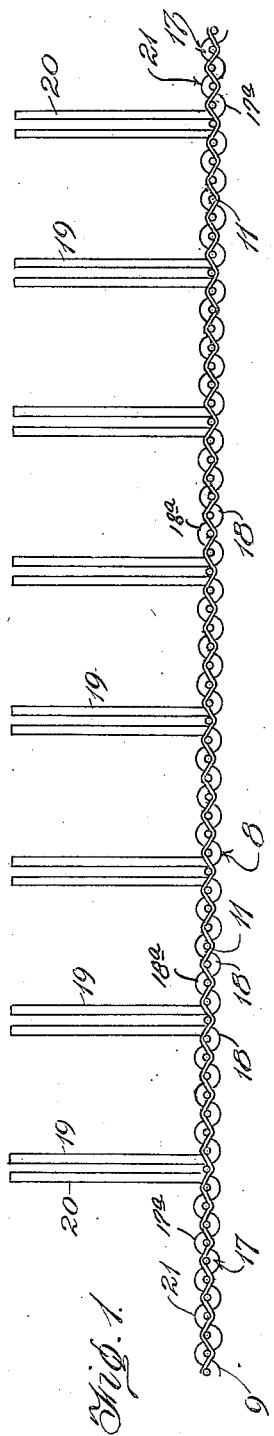

2,123,805

UNITED STATES PATENT OFFICE 2,123,805

MOP

Nathan C. Richardson and Richard B. Pekor, Columbus, Ga.

Application March 19, 1936, Serial No. 69,693

1 Claim. (Cl. 139—391)

This invention relates to a mop.

The object of the invention resides in the production of an economical, durable and thoroughly efficient mop from a continuously woven strip of fabric.

A further object of the invention resides in the production of a mop having a pile working surface, from a continuously woven strip of fabric.

A further object of the invention resides in the production of a mop from a continuously woven strip of fabric including warp threads of different thicknesses and with stretches of the warp threads of greater thickness extended outwardly with respect to the other warp threads and severed to provide the mop with a pile working surface.

A further object of the invention resides in the production of a mop from a continuously woven strip of fabric including weft threads, and warp threads of different thickness, spaced stretches of the warp threads of greater thickness being extended outwardly with respect to the other warp threads, during the weaving of the strip, and severed to provide the mop with a pile working surface, and with the threads of smaller thickness and the weft threads acting to lock the pile.

A further object of the invention resides in the production of a mop from a continuously woven strip of fabric including warp threads of different thicknesses and weft threads, the warp threads of smaller thickness being arranged in spaced sets, the warp threads of greater thickness being alternately disposed with respect to said sets and having spaced stretches thereof extended outwardly with respect to said sets and severed, during the weaving of the strip, to provide the mop with a pile working surface, and with the weft threads and the warp threads of smaller thickness locking the pile to the fabric body.

A further object of the invention resides in the production of a mop from a continuously woven strip of fabric including warp threads having spaced severed stretches thereof extended from the outer face of the strip to form the mop with a flexible, shiftable pile working surface.

A further object of the invention resides in the production of a flexible mop from a continuously woven strip of fabric having warp threads thereof disposed in a manner, during the weaving of the strip, to provide the mop with a pile working surface spaced inwardly adjacent the edges of the strip.

A further object of the invention resides in the production of a flexible mop from a continuously woven strip of fabric having filler or weft threads and two groups of warp threads, the threads of one group being of greater thickness than the threads of the other group, the threads of the said other group being arranged in spaced sets, the warp threads of greater thickness being alternately arranged with respect to said sets and disposed in a manner, during the weaving of the strip to provide the mop with a pile working surface.

To the above ends essentially and to others which may hereinafter appear the invention consists of a mop construction which falls within the scope of the invention as claimed.

In the drawing:

Figure 1 is a diagrammatic view of a completed mop illustrating the pile forming stretches of a warp thread disposed vertically and in spaced relation, Figures 2, 3 and 4 are diagrammatic views illustrating the successive steps applied to a warp thread, during the weaving of the strip of fabric to form the latter with spaced extended severed stretches to form spaced pile forming members.

Figure 5 is a fragmentary view in bottom plan of the woven strip of fabric,

Figure 6 is a perspective view of the mop,

Figure 7 is a side elevation, upon a reduced scale illustrating the woven continuous strip formed in a manner to provide a series of spaced tandemwise arranged complete mop forming sections with the pile providing the working face for a mop hanging downwardly.

The woven continuous strip of fabric from which the mops are severed is generally indicated at 8. The fabric 8 includes a series of sectional coarse warp threads 9 disposed in spaced relation wtih respect to each other, a series of fine continuous warp threads 10 and a weft thread 11. The fine warp threads 10 are arranged in a series of sets 10ᵃ of threads and with the said sets disposed in lateral spaced relation with respect to each other. Only one of the outer sets of said series of sets is shown and is indicated at 12. The intermediate sets of said series of sets are designated at 13. A coarse warp thread 9 is arranged between each pair of sets of fine warp threads. The thread 11 is formed with oppositely extending strands 11ᵃ providing bites at each side of the strip 8. Each set of fine warp threads may consist of two or more threads, and is shown by way of example as consisting of two. The threads of each set of fine warp threads are arranged in sidewise abutting relation. The coarse warp threads 9 are alternately arranged with respect to the sets of fine warp threads 10. Preferably the thickness of the threads 10 and 11 will be the same. The thickness of the threads 9 will always be greater than that of the threads 10 and 11. The coarse warp threads 9 are arranged in spaced alignment in sidewise relation.

The strip 8 is of the desired length and width and when woven continuously it will embody a series of tandemwise arranged spaced connected together mop forming sections 14 (Figure 7). Each section is adapted for severance from the strip and when severed constitutes a complete mop 15 (Figure 6) consisting of a flexible body 16 having a pile working surface 16a and with the body 16 having a selvage at each side and at each end extending outwardly from the pile working surface 16a.

The warp threads 9, during the weaving of the strip 8 are acted upon in a manner to form looplike spaced stretches extended outwardly with respect to the threads 10 and 11 and which stretches are severed at their outer ends to provide pile forming members.

Each coarse thread 9 of the body 16 of the mop will be formed of a pair of spaced oppositely disposed endwise aligned angle-shaped end sections 17 and a series of spaced endwise aligned U-shaped intermediate sections 18 arranged between and spaced from the sections 17.

Each end section 17 consists of a base 17a and a portion 17b extending outwardly from the inner end of base 17a to provide a pile member. Each section 18 will consist of a base 18a and portions 19 extending outwardly from the ends of the base 18a to form pile members. The bases 17a and 18a of the coarse warp threads are aligned with the sides of the fine warp threads 10. The bases of the end sections 17 at one end of the coarse warp threads are sidewise aligned with each other, the bases of the end sections 17 at the other end of the coarse warp threads are sidewise aligned with each other and the bases 18a of the intermediate sections 18 of one coarse warp thread are sidewise aligned with the bases 18a of the intermediate sections 18a of the other coarse warp threads.

The strands 11a of the weft or filler thread 11 interlace with the fine warp threads. A group of the strands 11a of the thread 11 interlaces with the bases of the end sections 17 at one of the coarse warp threads. An independent group of the strands 11a of the thread 11 interlaces with the bases of the end sections 17 at the other end of the coarse warp threads and spaced groups of the strands 11a of the thread 11 interlace with the sidewise aligned bases of the intermediate sections 18 of the coarse warp threads. The groups of the strands of the warp thread 11 which interlace with the several bases of the coarse warp threads referred to also interlace with the fine warp threads.

The pile 20 formed by the portions 17b and 19 of the sections of the threads 9 is spaced inwardly adjacent the side and end edges of the severed portion of the strip 8 thereby providing a selvage 21 at each end of the mop and the selvage 21a at each side of the mop.

During the weaving of the strip 8, the warp threads 9 are simultaneously formed, at a spaced interval with outwardly directed sidewise aligning looped portions 22 which are shifted to overlie the threads 10 and 11. The looped portions 22 are open at their inner ends and closed at their outer ends. At the end of the shift of a set of sidewise aligning intermediate looped portions 22, the said portions 22 at their outer ends are severed to provide the intermediate sections of the warp threads and the pile forming members 19. At the end of the shift of the first and the last formed set of sidewise aligning loop forming portions 22, the said first and last formed sets are severed at their outer ends to provide the end sections of the coarse warp threads and the pile forming members 17a. The pile forming members 19 are arranged between the pile forming members 17a.

What we claim is:

A mop comprising a fabric body formed of spaced parallel sets of continuous fine warp threads, a series of sectional coarse warp spaced parallel threads and a continuous weft thread, each coarse warp thread being arranged between a pair of sets of fine warp threads, each of said coarse warp threads consisting of a pair of endwise aligned spaced end sections and a series of spaced endwise aligned intermediate sections arranged between said end sections, each end section including a base and a portion extending outwardly from the inner end of the base to provide a pile forming member, each intermediate section including a base the intermediate base section being interlaced with the weft in a W weave and a portion extending outwardly from each end of its base to form spaced pile forming members, the bases of the end sections of a coarse warp thread arranged in sidewise aligning relation with respect to the bases of the end sections of the other coarse warp threads, the bases of the intermediate sections of one of said coarse warp threads arranged in sidewise aligning relation with respect to the bases of the intermediate sections of the other coarse warp threads, said weft thread being formed with oppositely extending strands providing bights at the sides of said body against the outer ones of the fine warp threads, said strands interlaced with and throughout the fine warp threads, there being respectively a group of strands interlaced with the sidewise aligned bases of the sections at one end of the coarse warp threads; a group of strands interlaced with the sidewise aligned bases of the sections at the other end of the coarse warp threads; and spaced groups of strands interlaced with the sidewise aligned bases of the intermediate sections of the coarse warp threads.

NATHAN C. RICHARDSON.
RICHARD B. PEKOR.